United States Patent
Adachi

[19]
[11] Patent Number: 6,066,072
[45] Date of Patent: May 23, 2000

[54] TORQUE CONVERTER RELATIVE ROTATION CONTROL DEVICE

[75] Inventor: Kazutaka Adachi, Yokohama, Japan

[73] Assignee: Nissan Motor Co., Ltd., Kanagawa, Japan

[21] Appl. No.: 09/184,862

[22] Filed: Nov. 3, 1998

[30] Foreign Application Priority Data

Nov. 4, 1997 [JP] Japan .................................. 9-301830

[51] Int. Cl.$^7$ .................................................. F16H 61/14
[52] U.S. Cl. .............................................. 477/176; 701/68
[58] Field of Search .................................... 477/166, 168, 477/169, 174, 175, 176, 62, 64, 65; 701/67, 68

[56] References Cited

U.S. PATENT DOCUMENTS

| | | | |
|---|---|---|---|
| 4,582,185 | 4/1986 | Grimes et al. | 477/176 X |
| 4,706,790 | 11/1987 | Lockhart et al. | 477/176 X |
| 5,029,087 | 7/1991 | Cowan et al. | 477/169 X |
| 5,267,158 | 11/1993 | Sakaguchi et al. | 477/174 X |
| 5,283,738 | 2/1994 | Schwab et al. | 701/68 |
| 5,474,506 | 12/1995 | Palansky et al. | 477/176 X |
| 5,484,354 | 1/1996 | Vukovich et al. | 474/176 X |
| 5,527,238 | 6/1996 | Hrovat et al. | 477/169 X |
| 5,611,750 | 3/1997 | Kono et al. | 477/169 X |
| 5,653,661 | 8/1997 | Kato et al. | 477/176 |
| 5,683,329 | 11/1997 | Kono et al. | 477/176 |
| 5,733,223 | 3/1998 | Matsubara et al. | 477/175 |
| 5,853,350 | 12/1998 | Hasegawa et al. | 477/175 X |

FOREIGN PATENT DOCUMENTS

5-133469  5/1993  Japan .

*Primary Examiner*—Dirk Wright
*Attorney, Agent, or Firm*—McDermott, Will & Emery

[57] ABSTRACT

A torque transmission efficiency is improved by controlling a relative rotation of an input element and output element of a torque converter. A tightening pressure of a lockup clutch of the torque converter is feedback-controlled based on a deviation between a target relative rotation speed and a real relative rotation speed. The response of the feedback control is suppressed to a low level so that low frequency rotational fluctuations of the engine do not cause rotational fluctuations of the output element. By processing the target relative rotation speed by a filter variable based on vehicle speed and engine load before calculating the deviation, the ability of the real relative rotation speed to track the target relative rotation speed is not impaired.

8 Claims, 10 Drawing Sheets

TORQUE CONVERTER RELATIVE ROTATION CONTROL DEVICE

FIELD OF THE INVENTION

This invention relates to control of the relative rotation between the input/output elements of a torque converter used with an automatic transmission of a vehicle.

BACKGROUND OF THE INVENTION

A torque converter used with an automatic transmission of a vehicle permits absorption of torque variations and increase of torque by transmitting power between an input element and output element via a fluid.

However, torque transmission efficiency is low compared with a friction type clutch because the torque is transmitted via a fluid.

In order to increase the torque transmission efficiency, a lockup clutch is known in the art which directly connects the input and output elements under running conditions when absorption of torque variation and increase of torque are unnecessary. However, its effect is limited by merely switching the lockup clutch on and off.

In order to improve the torque transmission efficiency through a fluid, Tokkai Hei 5-133469 published by the Japanese Patent Office in 1993 discloses a system wherein the relative rotation speed of an input element and output element is feedback controlled to a target relative rotation speed by maintaining the lockup clutch in a position between on and off.

Even when the engine rotation speed is in a steady operating state, it varies with a low frequency due to imperfect combustion in a specific cylinder or fuel injection control error for a specific cylinder.

The response of the feedback control system must be suppressed to a low level to prevent this fluctuation from influencing the control of the relative rotation speed of the input element and output element of the torque converter.

However, when the tracking performance of the real relative rotation speed with respect to the target relative rotation speed is poor, it has an adverse effect on the improvement of the torque transmission efficiency.

SUMMARY OF THE INVENTION

It is therefore an object of this invention to improve relative rotation control response characteristics of input and output elements while maintaining resistance to fluctuations of engine rotation speed.

In order to achieve the above object, this invention provides a relative rotation control device for a torque converter which is interposed between an engine and an automatic transmission and varies the relative rotation speed of input and output elements according to the tightening state of a lockup clutch. The device comprises a sensor for detecting a running state of a vehicle, a sensor for detecting a real relative rotation speed of the torque converter, and a microprocessor programmed to calculate a target relative rotation speed basic value based on the running state, set a filter variable according to the running state of the vehicle, calculate a target relative rotation speed by applying filter processing based on the filter variable to the target relative rotation speed basic value, calculate a relative rotation command value based on a deviation between the target relative rotation speed and the real relative rotation speed, and control a tightening pressure of the lockup clutch to a value corresponding to the relative rotation command value.

It is preferable that the filter variable is determined based on a speed of the vehicle and a load of the engine.

It is further preferable that the filter variable is determined based on a speed of the vehicle, a load of the engine, and a gear ratio of the automatic transmission.

It is also preferable that the filter variable is determined based on a speed of the vehicle, a load of the engine, and a rotation speed of the output element.

In this case, it is further preferable that the filter variable is a fraction comprising a denominator and a numerator, the denominator is set based on the speed of the vehicle and the load of the engine, and the numerator is set based on the rotation speed of the output element.

It is still further preferable that the denominator is set based on a speed of the vehicle, the load of the engine and a gear ratio of the automatic transmission.

It is also preferable that a calculation of the relative rotation command value is performed under a predetermined transfer function, and the filter variable is set equal to an inverse of the transfer function.

It is also preferable that a calculation of the relative rotation command value is performed under a predetermined transfer function given by a polynomial expression, and the filter variable is set equal to the inverse of a slowest mode in the polynomial expression.

It is also preferable that the torque converter comprises a relative rotation mechanism which causes the relative rotation of the input element and output element under a predetermined transfer function determined according to characteristics of the torque converter and an inertia of the engine, and the filter variable is set equal to the inverse of the transfer function.

The details as well as other features and advantages of this invention are set forth in the remainder of the specification and are shown in the accompanying drawings.

DESCRIPTION OF THE PREFERRED EMBODIMENTS

Figure 1:
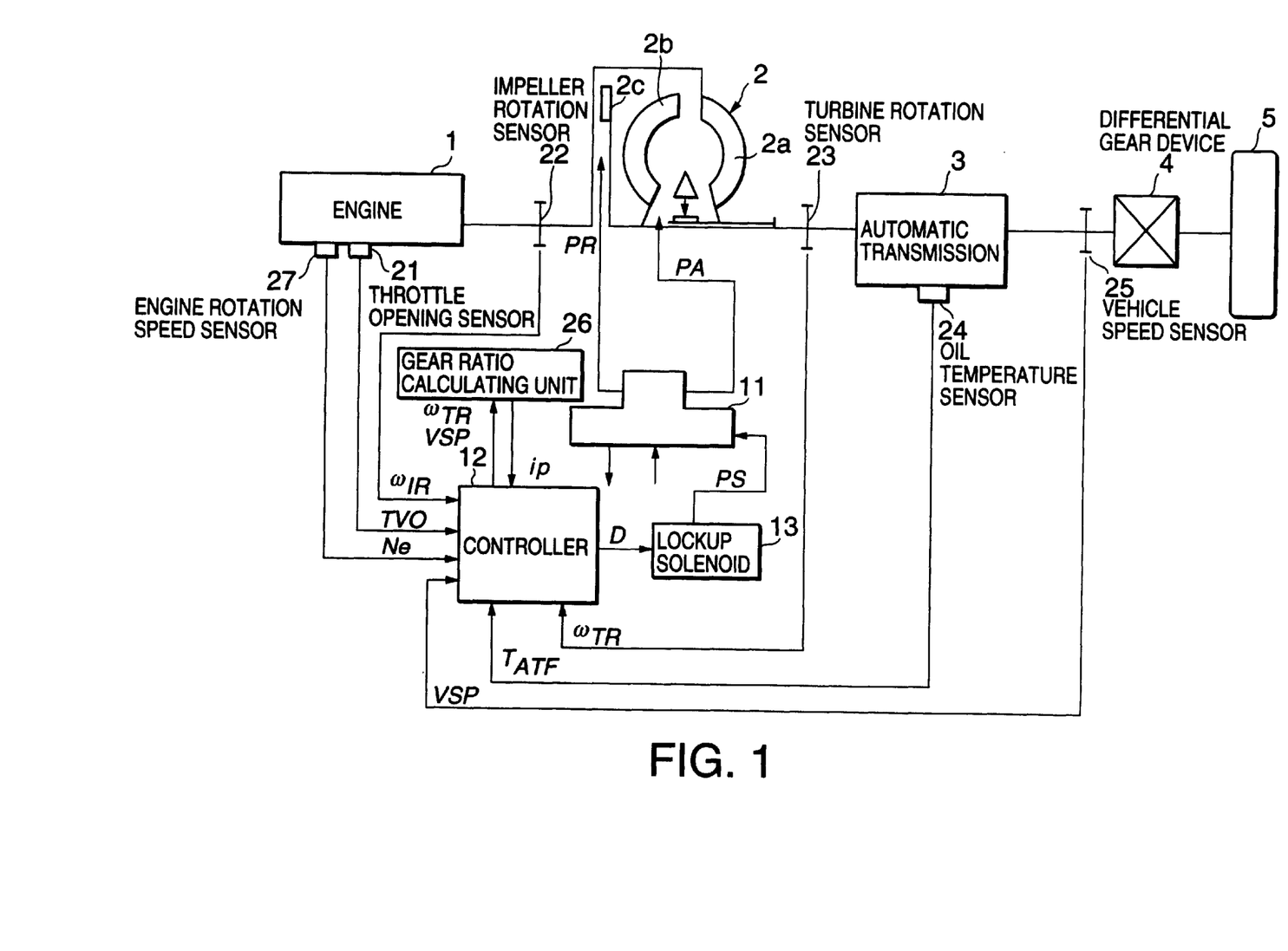
FIG. 1 is a schematic diagram of a vehicle drive system having a relative rotation control device according to this invention.

Referring to FIG. 1 of the drawings, a multi-cylinder engine 1 for a vehicle is connected to an automatic transmission 3 via a torque converter 2, and the output of the automatic transmission 3 is transmitted to drive wheels 5 via a differential gear device 4.

The torque converter 2 comprises a pump impeller 2A which functions as an input element driven by the engine 1, a turbine runner 2B which functions as an output element connected to the input shaft of the automatic transmission 3, and a lockup clutch 2C which directly connects the turbine runner 2B with the input shaft of the pump impeller 2A.

The tightening force of the lockup clutch 2C is determined by the pressure difference between an application pressure PA and release pressure PR. These pressures are provided in the form of pressurized oil from a control valve 11.

If the application pressure PA is lower than the release pressure PR, the lockup clutch 2C is in an unlocked state, and the pump impeller 2A and turbine runner 2B rotate due to the torque transmission function of the fluid interposed between them.

When the application pressure PA is higher than the release pressure PR, the lockup clutch 2C tightens according to the pressure difference.

When the pressure difference is small, a torque is transmitted according to the tightening power while the pump impeller 2A and turbine runner 2B are performing a relative rotation due to slip.

When the pressure difference increases beyond a set value, the pump impeller 2A and turbine runner 2B enter a direct connection state without relative rotation, i.e. a lockup state.

In a state not reaching lockup when relative rotation is possible, the torque converter 2 transmits torque in two ways, i.e. via the fluid and via mechanical transmission by the lockup clutch 2C.

The engine output torque is equal to the sum of these torques.

Therefore, if the fluid transmission torque is subtracted from the engine output torque, the transmission torque via the lockup clutch can be calculated.

The transmission torque of the lockup clutch is expressed as a tightening capacity of the lockup clutch 2C.

In this invention, the fluid transmission torque is first calculated from the torque converter transmitting performance, and the lockup clutch tightening capacity is computed so that a target relative rotation is obtained.

Herein, a ratio of the relative rotation speed $\omega_{SLP}$ of the pump impeller 2A and turbine runner 2B and the fluid transmission torque $t_{CNV}$, is defined as a relative rotation gain $g_{SLP}$ by the following equation (1).

$$g_{SLP} = \frac{\omega_{SLP}}{t_{CNV}} \quad (1)$$

Figure 6:
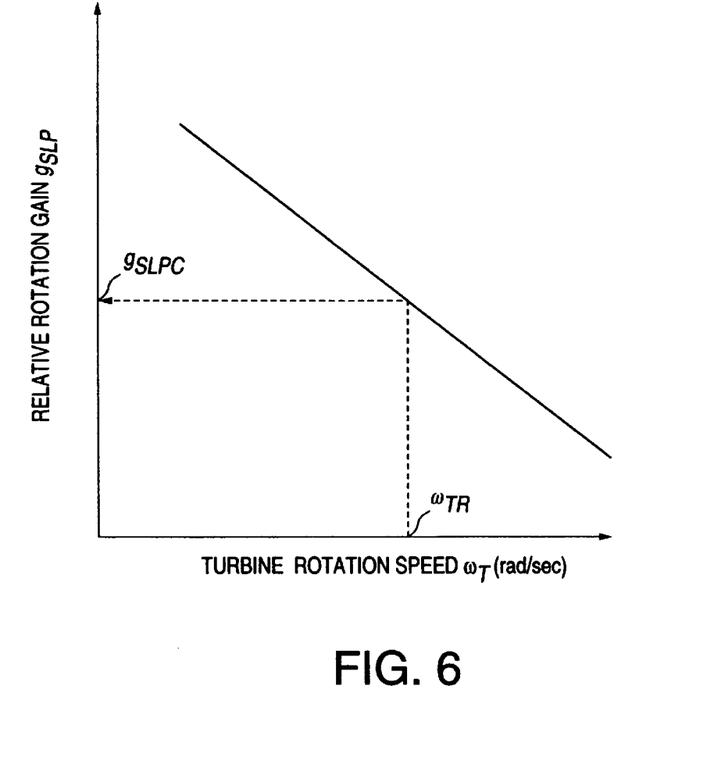
FIG. 6 is a graph showing a relation between a turbine rotation speed of a torque converter and a relative rotation gain according to this invention.

The inventor confirmed that the relative rotation gain $g_{SLP}$ varies according to the turbine rotation speed $\omega_{TR}$ as shown in FIG. 6.

This invention calculates the fluid transmission torque to achieve a target relative rotation speed of input and output elements, and calculates the lockup clutch tightening capacity at which the input and output elements achieve the specified relative rotation, by subtracting this fluid transmission torque from the engine output torque.

Figure 2:
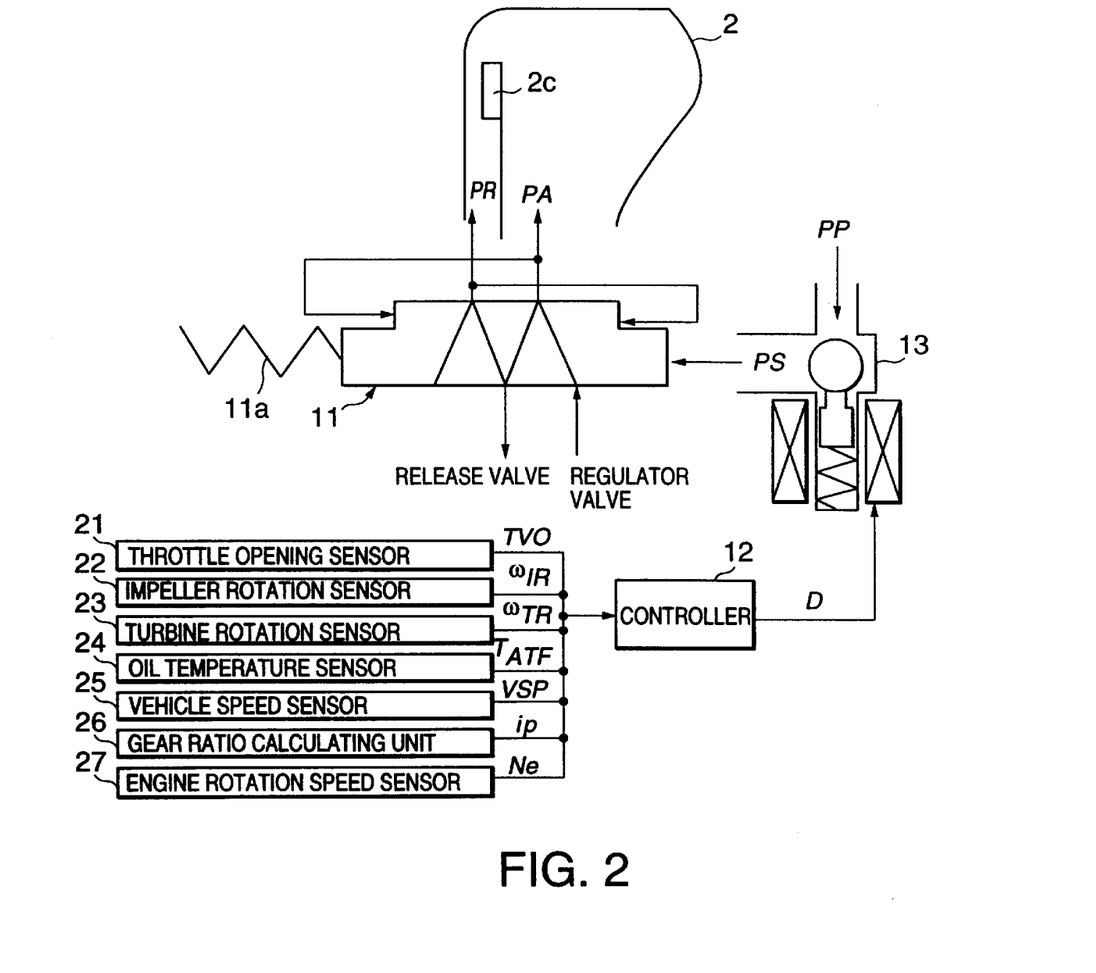
FIG. 2 is a schematic diagram of the relative rotation control device.

For this purpose, the relative rotation control device comprises the control valve 11, a lockup solenoid 13, a controller 12, and a gear ratio calculating unit 26.

Figure 3:
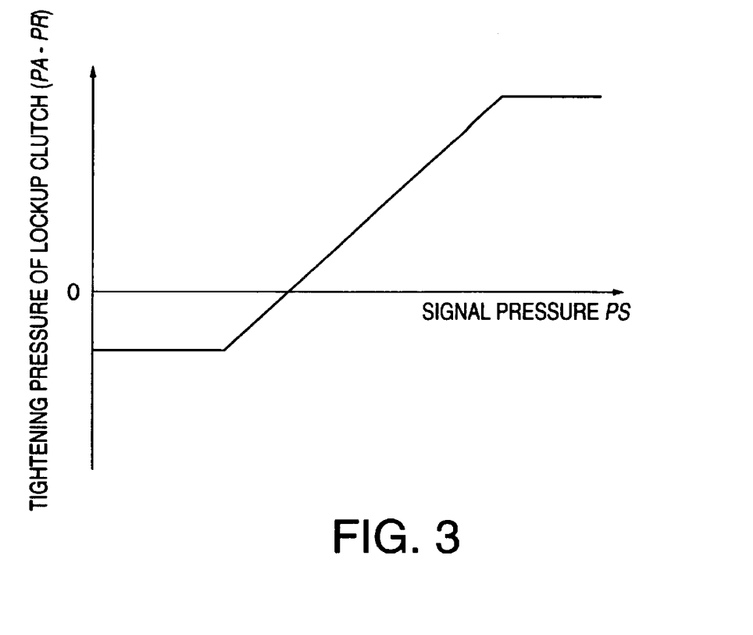
FIG. 3 is a graph showing control characteristics of a control valve according to this invention.

The control valve 11 supplies the application pressure PA and release pressure PR to the lockup clutch 2C according to a signal pressure PS input from the lockup solenoid 13. According to the control valve 11, the pressure difference between the application pressure PA and release pressure PR, i.e., the tightening pressure of the lockup clutch 2, varies according to the signal pressure PS as shown in FIG. 3.

The lockup solenoid 13 is duty controlled according to a signal D from the controller 12, and the corresponding signal pressure PS is generated from a predetermined pilot pressure PP as shown in FIG. 2. That is, the signal pressure PS is increased as the duty ratio of the signal D increases.

To generate this signal D, signals are input to the controller 12 from a throttle opening sensor 21 which detects a throttle opening TVO of the engine 1, impeller rotation sensor 22 which detects a rotation speed $\omega_{IR}$ of the pump impeller 2A, turbine rotation sensor 23 which detects a rotation speed $\omega_{TR}$ of the turbine runner 2B, oil temperature sensor 24 which detects an oil temperature $T_{ATF}$ in the automatic transmission 3, speed sensor 25 which detects a vehicle speed VSP and engine rotation speed sensor 27 which detects an engine rotation speed Ne.

The gear ratio calculating unit 26 calculates a real gear ratio ip of the automatic transmission 3 from the rotation speed $\omega_{TR}$ of the turbine runner and the vehicle speed VSP, and inputs it to the controller 12.

The controller 12 comprises a microcomputer provided with a central processing unit (CPU), read-only memory ROM), random-access memory (RAM), and an input/output interface. The gear ratio calculating unit 26 also comprises a similar microcomputer.

These units may also be realized by one microcomputer.

Figure 4:
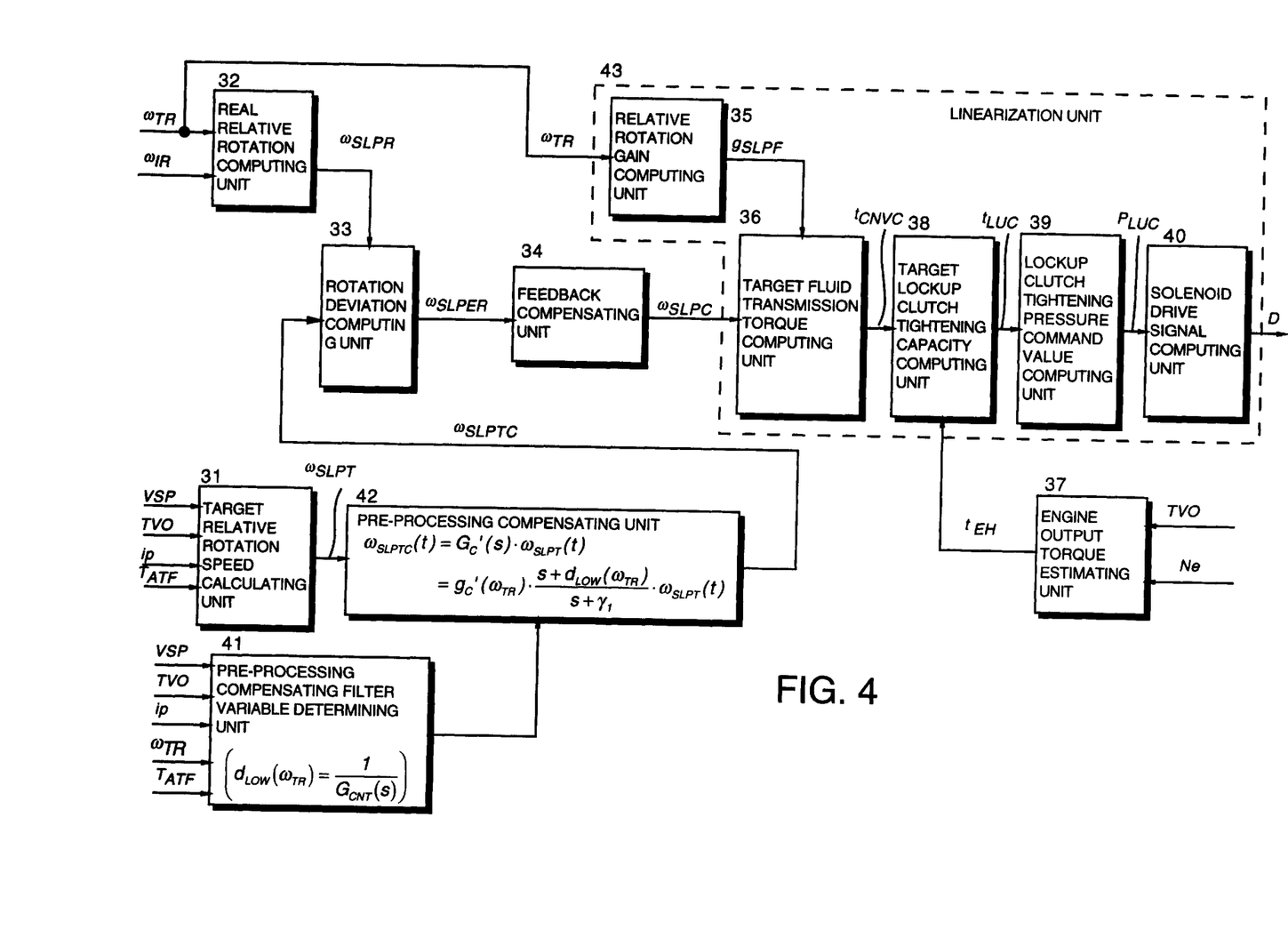
FIG. 4 is a block diagram describing the function of a controller according to this invention.

Due to the aforesaid construction, the controller 12 comprises the virtual processing units shown in FIG. 4, and the signal D corresponding to the input signals is generated by these processing units.

Specifically, a target relative rotation speed calculating unit 31 determines the target relative rotation speed $\omega$SLPTof the pump impeller 2A and turbine runner 2B based on the vehicle speed VSP, throttle opening TVO, gear ratio ip and oil temperature $T_{ATF}$.

The target relative rotation speed $\omega_{SLPT}$ is the smallest permitted relative rotation speed at which fluctuation of engine output torque due to scatter in the combustion of the engine 1 and the pulsation noise emitted by the drive system due to this fluctuation are still acceptable. The target relative rotation speed $\omega_{SLPT}$ is preset by experiment according to the aforesaid input values.

A real relative rotation computing unit 32 computes the real relative rotation speed $\omega_{SLPR}$ of the torque converter 2 by subtracting the rotation speed $\omega_{TR}$ of the turbine runner 2B from the rotation speed $\omega_{IR}$ of the pump impeller 2A.

The relative rotation control of the torque converter basically makes the real relative rotation speed $\omega_{SLPR}$ coincide with the target relative rotation speed $\omega_{SLPT}$.

In this invention, a target relative rotation correction value $\omega_{SLPTC}$ obtained by performing the following processing on the target relative rotation speed $\omega_{SLPT}$ is used as a control target value.

For this purpose, the controller 12 comprises a pre-processing compensating unit 42 and a pre-processing compensating filter conversion determining unit 41.

A deviation $\omega_{SLPER}$ between the target relative rotation correction value $\omega_{SLPTC}$ computed by these units and the real relative rotation speed $\omega_{SLPR}$ computed by the real relative rotation computing unit 32, is calculated as shown by the following equation (2) by a rotation deviation computing unit 33.

$$\omega_{SLPER}(t) = \omega_{SLPTC}(t) - \omega_{SLPR}(t) \tag{2}$$

In the equation, (t) indicates a value at a time t.

A feedback compensating unit 34 computes a relative rotation speed command value $\omega_{SLPC}$ from the following equation based on its transfer characteristic $G_{CNT}(s)$ such that the deviation $\omega_{SLPER}$ is 0. When it is achieved, the real relative rotation speed $\omega_{SLPR}$ is equal to the target relative rotation correction value $\omega_{SLPTC}$.

$$\omega_{SLPC}(t) = G_{CNT}(s) \cdot \omega_{SLPER}(t) \tag{3}$$

In a linearization unit 43, the relative rotation speed command value $\omega_{SLPC}$ is converted to a duty signal D output to the lockup solenoid 13.

The linearization unit 43 comprises a relative rotation gain computing unit 35, target fluid transmission torque computing unit 36, target lockup clutch tightening capacity computing unit 38, lockup clutch tightening pressure command value computing unit 39, and solenoid drive signal computing unit 40 as shown in FIG. 4.

The relative rotation gain calculation unit 35 calculates a relative rotation gain $g_{SLPC}$ from the rotation speed $\omega_{TR}$ of the turbine runner 2B by referring to a map shown in FIG. 6.

Preferably, processing is performed by a low-pass filter having a first order delay constant $T_{SLP}$ shown by the following equation (4) so that the relative rotation gain $g_{SLPC}$ does not vary frequently or sharply.

$$g_{SLPF}(t) = \frac{1}{T_{SLP} \cdot s + 1} \cdot g_{SLPC} \tag{4}$$

where s is a differential operator.

The control can be stabilized by using a value $g_{SLPF}(t)$ processed by equation (4) as a relative rotation gain.

The target fluid transmission torque computing unit 36 substitutes $g_{SLPF}(t)$ in the relative rotation gain $g_{SLP}$ of equation (1) and substitutes $\omega_{SLP}(t)$ calculated by equation (3) in the relative rotation speed $\omega_{SLP}$, and a target fluid transmission torque $t_{CNV}(t)$ is calculated by the next equation (5).

$$t_{cnvc}(t) = \frac{\omega_{SLPC}(t)}{g_{SLPF}} \tag{5}$$

Figure 7:
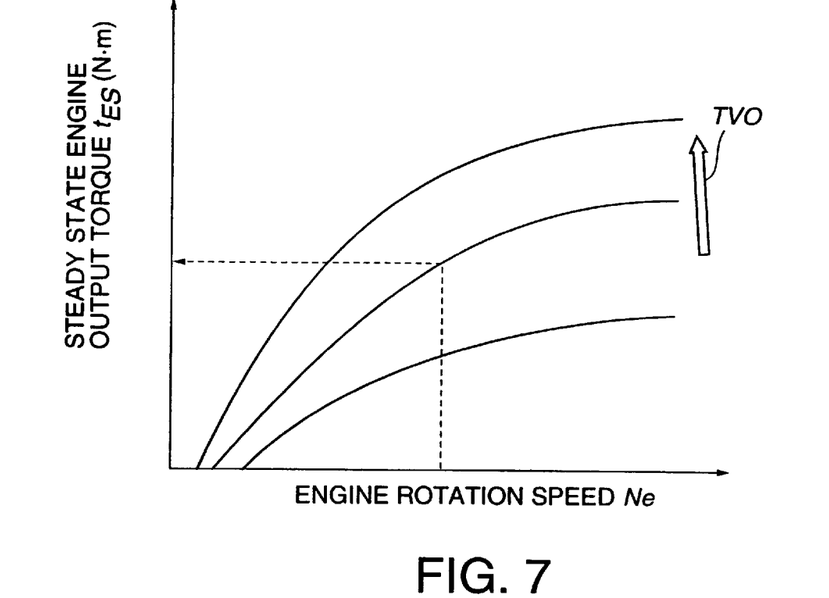
FIG. 7 is a graph showing a relation between a throttle opening, rotation speed and output torque of an engine.

The engine output torque estimating unit 37 looks up a steady value $t_{ES}$ of the engine output torque by referring to a map having the contents shown in FIG. 7 based on the engine rotation speed Ne and throttle opening TVO.

This value is filter processed by the next equation (6) using a time constant $T_{ED}$ taking account of a dynamic delay of the engine.

$$t_{EH}(t) = \frac{1}{t_{ED} \cdot s + 1} \cdot t_{ES}(t) \tag{6}$$

The target lockup clutch tightening capacity computing unit 38 computes a target lockup clutch tightening capacity $t_{LUC}(t)$ by subtracting the target fluid transmission torque $t_{CNV}(t)$ obtained by equation (5) from an engine output torque $t_{EH}(t)$ obtained as described above.

$$t_{LUC}(t) = t_{EH}(t) - T_{CNVC}(t) \tag{7}$$

Figure 8:
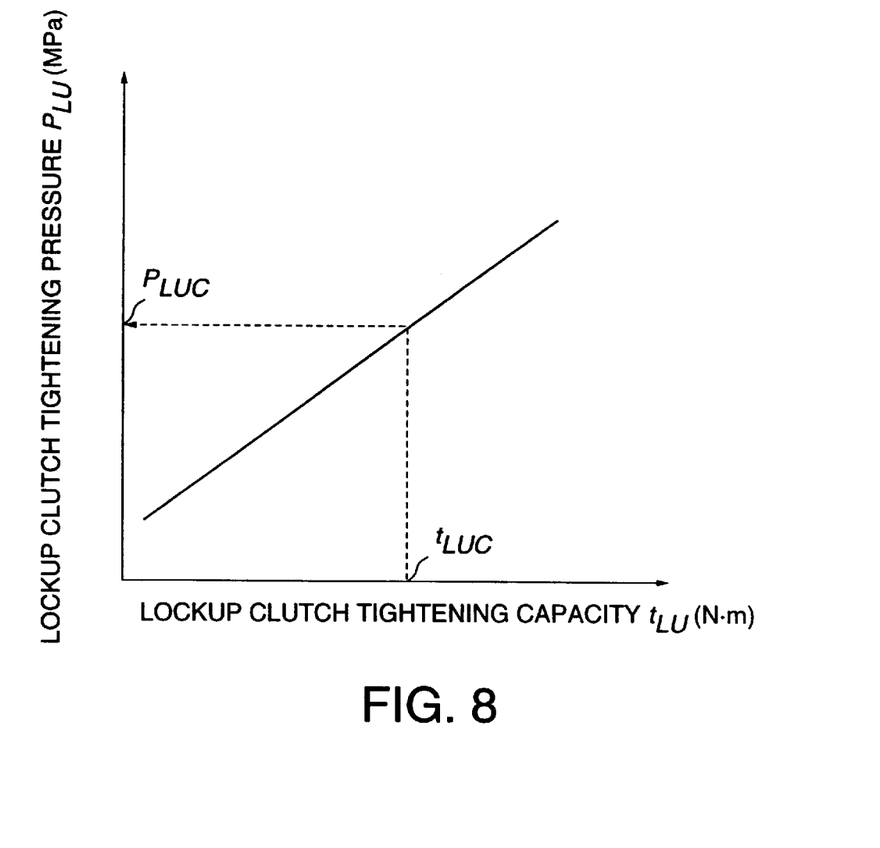
FIG. 8 is a graph showing a relation between a tightening capacity and tightening pressure of a lockup clutch according to this invention.

The lockup clutch tightening pressure command value computing unit 39 calculates a lockup clutch tightening pressure command value $P_{LUC}$ required to achieve the target lockup clutch tightening capacity $t_{LUC}(t)$ by referring to a map having the contents shown in FIG. 8.

This map is drawn up beforehand by finding a relation between the tightening pressure $P_{LU}$ and lockup tightening capacity $t_{LUC}$ of the lockup clutch 2C by experiment.

A solenoid drive signal computing unit 40 calculates the corresponding command signal D based on the lockup clutch tightening pressure command value $P_{LUC}$, and outputs it to the lockup solenoid 13.

Figure 5:
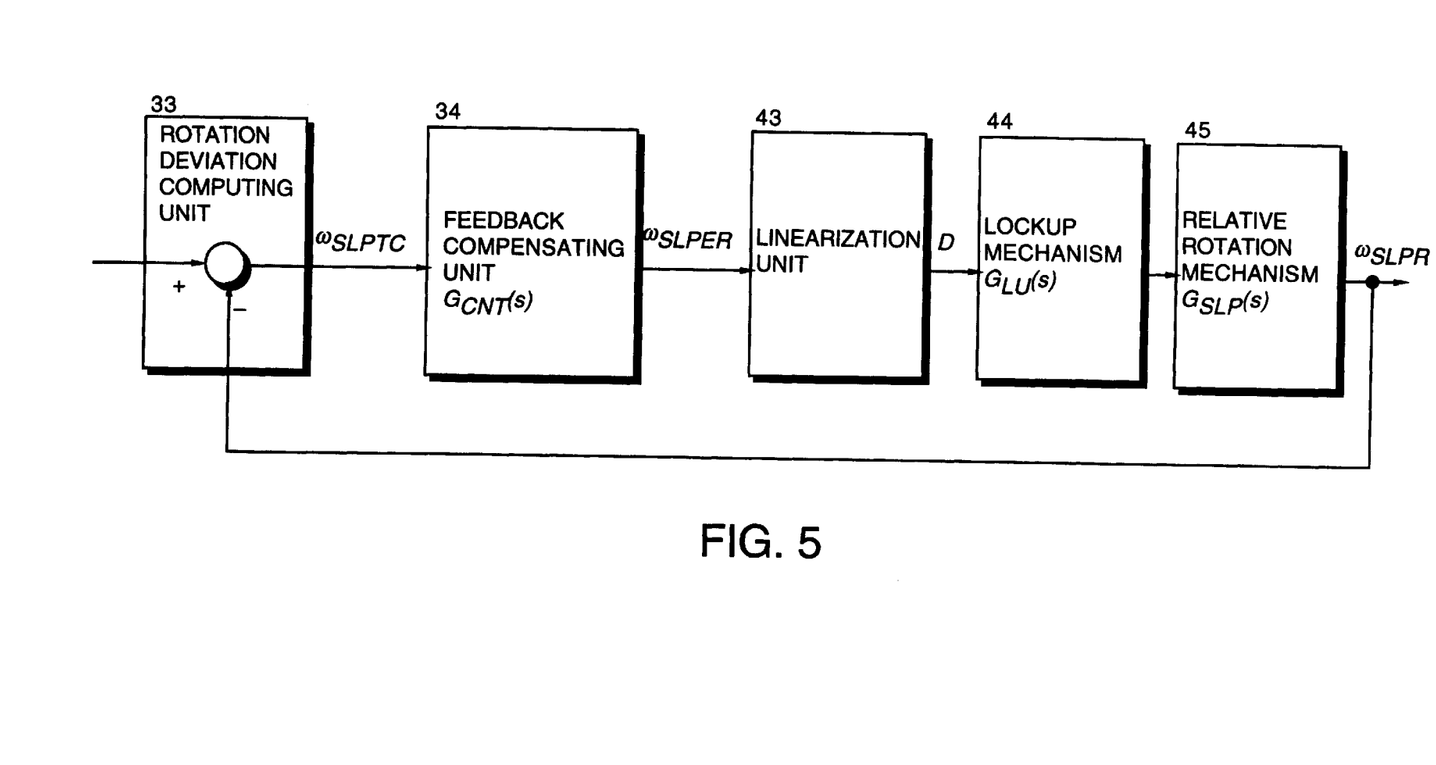
FIG. 5 is a block diagram describing a feedback control function of the controller.

As a result, the real relative rotation speed $\omega_{SLPR}$ of the lockup clutch 2C varies so as to coincide with the signal D via the lockup mechanism 44 and relative rotation mechanism 45 shown in FIG. 5.

The lockup mechanism 44 and relative rotation mechanism 45 conceptually represent lockup and relative rotation mechanisms of the pump impeller 2A and turbine runner 2B formed by the torque converter 2, control valve 11 and lockup solenoid 13.

Thus, the relative rotation of the pump impeller 2A and turbine runner 2B of the torque converter 2 is controlled by a feedback control system comprising the rotation deviation computing unit 33, feedback compensating unit 34, linearization unit 43, lockup mechanism 44, and relative rotation mechanism 45 as shown in FIG. 5.

The transfer function $G_{FB}(s)$ of the aforesaid feedback control system is expressed by the following equation (8).

$$G_{FB}(s) = \frac{G_{CNT}(s) \cdot G_{LU}(s) \cdot G_{SLP}(s)}{1 + G_{CNT}(s) \cdot G_{LU}(s) \cdot G_{SLP}(s)} \tag{8}$$

$$= g_{FB}(\omega_{TR}) \cdot \frac{\{s + n_0(\omega_{TR})\} \cdot}{\{s + d_0(\omega_{TR})\} \cdot \{s + d_1(\omega_{TR})\} \cdot} \\ \{s + d_2(\omega_{TR})\} \cdots \{s + d_x(\omega_{TR})\}$$

where, $G_{CNT}(s)$=transfer function of the feedback compensating unit 34, $G_{LU}(s)$=transfer function of the lockup mechanism 44, $g_{SLP}(s)$=transfer function of the relative rotation mechanism 45, $n_x(\omega_{TR})$=coefficient of numnerator of feedback control system transfer function, and is a function of the rotation speed $\omega_{TR}$ of the turbine runner 2B, and $d_x(\omega_{TR})$=coefficient of denominator of feedback control system transfer function, and is a function of the rotation speed $\omega_{TR}$ of the turbine runner 2B.

$$g_{FB}(s) = \frac{d_0(\omega_{TR}) \cdot d_1(\omega_{TR}) \cdot d_2(\omega_{TR}) \cdots d_x(\omega_{TR})}{n_0(\omega_{TR}) \cdot n_1(\omega_{TR}) \cdots n_x(\omega_{TR})} \tag{9}$$

where, $g_{FB}(s)$=gain.

Herein, in this feedback control system, as the real relative rotation speed is fed back directly as shown in FIG. 5, the gain of the input signal and the output signal is 1.

The term with the smallest value in $\{s+dx\ (\omega_{TR})\}$ of equation (8) is the slowest mode of the denominator of the control system transfer function. In other words, it is the term which has the most effect on decrease of response.

When there is no pre-processing compensating unit 42, it is this value which controls the tracking of the real relative rotation speed $\omega_{SLPR}$ relative to the target relative rotation speed $\omega_{SLPT}$.

Therefore, pole-zero cancellation is performed by the pre-processing compensating unit 42 so that the slowest mode apparently does not appear, and tracking of the target relative rotation speed $\omega_{SLPT}$ is enhanced.

However, when the transfer function of the feedback compensating unit 34 is a fixed gain, the transfer function of the feedback control system varies according to the turbine rotation speed $\omega_{TR}$, and the pre-processing compensating unit 42 must be gain-scheduled according to the turbine rotation speed $\omega_T$. Moreover, a request for tracking the real relative rotation speed $\omega_{SLPR}$ with respect to the target relative rotation speed $\omega_{SLPT}$, i.e., a demanded transfer function $G_R$, is determined according to vehicle running states such as the vehicle speed VSP and throttle opening TVO.

Therefore, the following equation (10) may be considered as a target relative rotation correction value $\omega_{SLPTC}$ at each moment (t) which is the output of the pre-processing compensating unit 42.

$$\omega_{SLPTC}(t) = G_C(s) \cdot \omega_{SLPT}(t) \tag{10}$$

$$= g_C(\omega_{TR}) \cdot \frac{\{s + d_1(\omega_{TR})\} \cdot \{s + d_2(\omega_{TR})\} \cdot \{s + d_3(\omega_{TR})\} \cdots \{s + d_x(\omega_{TR})\}}{\{s + \gamma_1\} \cdot \{s + n_1(\omega_{TR})\} \cdot \{s + n_2(\omega_{TR})\} \cdots \{s + n_x(\omega_{TR})\}} \cdot \omega_{SLPT}(t)$$

where, $\gamma_1$=filter variable of pre-processing compensating unit 42, and $G_C(s)$=transfer function of the pre-processing compensating unit 42, which is a value proper to the unit.

Herein, $$g_c(\omega_{TR}) = \frac{\gamma_1 \cdot n_0(\omega_{TR}) \cdot n_1(\omega_{TR}) \cdots n_x(\omega_{TR})}{d_0(\omega_{TR}) \cdot d_1(\omega_{TR}) \cdot d_2(\omega_{TR}) \cdots d_x(\omega_{TR})}$$

$$G_R(s) = \frac{\gamma_1}{s + \gamma_1} = \text{demanded transfer function}.$$

However, in this case, it is expected that the computing load of the controller 12 may be large.

A way of reducing the load might be to compensate only a representative slow mode, e.g. compensate only the above-mentioned slow mode.

In this case, the target relative rotation correction value $\omega_{SLPTC}$ is given by the following equation (11).

The slowest mode can be found by a known method.

$$\omega_{SLPTC}(t) = G'_C(s) \cdot \omega_{SLPT}(t) \tag{11}$$

$$= g'_C(\omega_{TR}) \cdot \frac{s + d_{LOW}(\omega_{TR})}{s + \gamma_1} \cdot \omega_{SLPT}(t)$$

where, $$g'_C(\omega_{TR}) = \frac{\gamma_1}{d_{LOW}(\omega_{TR})}$$

Hence, by correcting the target relative rotation speed $\omega_{SLPT}$ by the pre-processing compensating unit 42, tracking of the real relative rotation speed with respect to the target relative rotation speed of the torque converter 2 can be ensured even when the response of the feedback compensator 34 is suppressed to a low level to control the effect of engine rotational fluctuations.

The pre-processing compensating filter variable determining unit 41 determines compensating filter variables applied by the pre-processing compensating unit 42 referred to as a denominator filter variable, is determined based on the vehicle speed VSP and throttle opening TVO which represents the engine load. It is determined based on the vehicle speed VSP, throttle opening TVO and real gear ratio ip of the automatic transmission 3.

Figure 12:
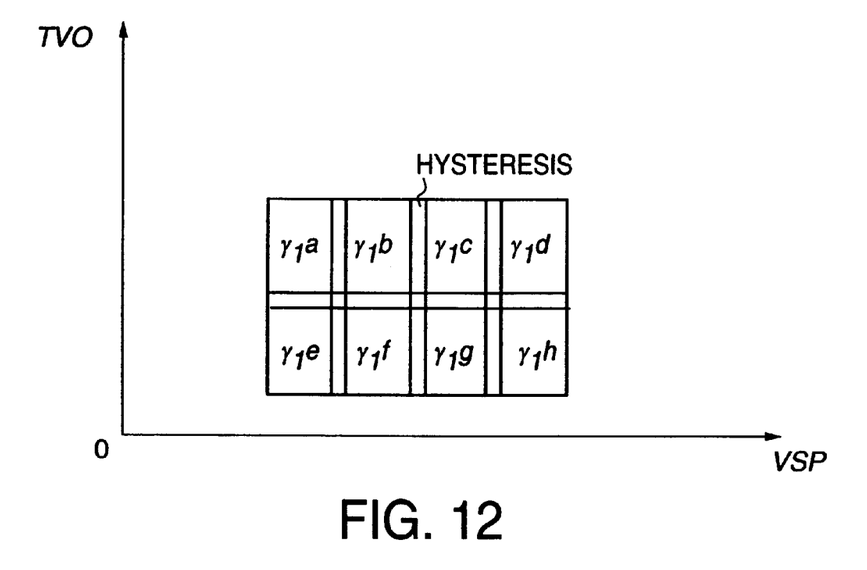
FIG. 12 is a diagram showing the contents of a map of a compensating filter variable at third gear ratio stored by the controller.
Figure 13:
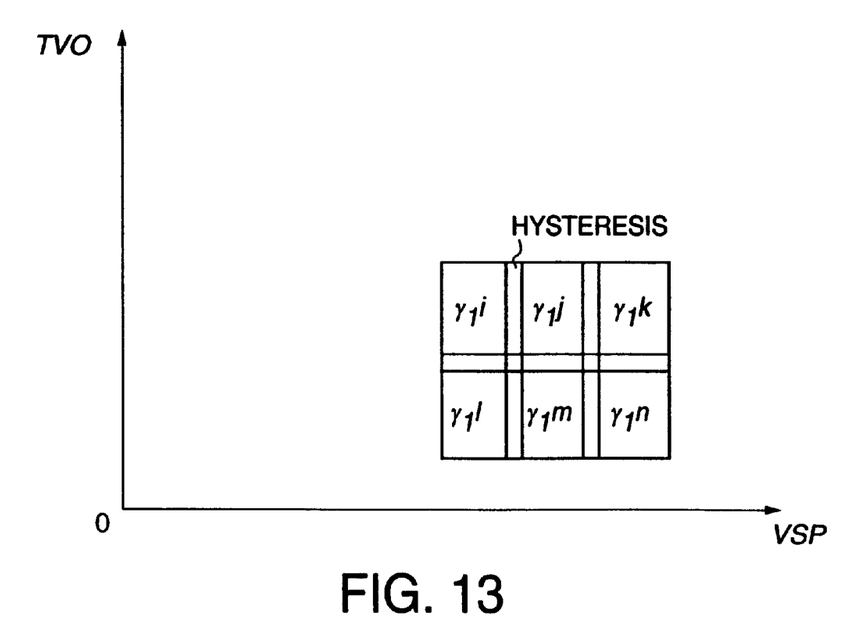
FIG. 13 is similar to FIG. 12, but showing a map of the compensating filter variable at fourth gear ratio.

This is found, for example, by looking up a map shown in FIGS. 12 and 13 stored beforehand by the controller 12.

The map of FIG. 12 is a map of the filter variable $\gamma_1$ when the automatic transmission 3 operates with the third gear ratio, and the map of FIG. 13 is a map of the filter variable $\gamma_1$ when the automatic transmission 3 operates with the fourth gear ratio.

When the filter variable $\gamma_1$ is determined based only on the vehicle speed VSP and throttle opening TVO regardless of the gear ratio, a single map may be used.

The filter variables may also be determined based on the vehicle speed VSP, throttle opening TVO and output rotation speed of the torque converter 2. In this case, it is desirable to determine the denominator filter variable $\gamma_1$ based on the vehicle speed VSP and throttle opening TVO, and to determine the numerator filter variable $d_{LOW}(\omega_{TR})$ based on the output rotation speed $\omega_T$ of the torque converter.

It is moreover possible to determine the denominator filter variable $\gamma_1$ based on the vehicle speed VSP, throttle opening TVO and gear ratio ip of the automatic transmission 3, and to determine the numerator filter variable $d_{LOW}(\omega_{TR})$ based on the output rotation speed $\omega_T$ of the torque converter.

In these cases also, necessary terms are determined by looking up maps which have been previously set according to the conditions.

It is also desirable that the numerator pre-processing compensating filter variable determining unit 41 sets the filter variable to be equal to the inverse of the transfer function of the feedback compensating unit 34, i.e., $1/G_{CNT}(s)$.

In that case, it is efficient to apply the inverse of a slow mode which is representative in the polynomial expressing the transfer function.

Alternatively, the pre-processing compensating filter variable determining unit 41 sets the numerator filter variable to be equal to the inverse of the transfer function $G_{SLP}(s)$ of the relative rotation mechanism 45 determined by the characteristic of the torque converter 2 and the inertia of the engine.

When the filter variables are set by either of these methods, the response of relative rotation control of the input and output elements of the torque converter 2 is enhanced as compared with the case where the target relative rotation speed $\omega_{SLTP}$ is used for control of the torque converter 2 without correcting the target relative rotation speed $\omega_{SLPT}$.

FIGS. 9A–9E show simulation results for tracking of the real relative rotation speed $\omega_{SLPR}$ with respect to the change in target relative rotation speed $\omega_{SLPT}$ when the vehicle speed VSP is 30 km/hr and the throttle opening TVO is maintained at approx. 10 degrees or ⅛ opening.

FIGS. 10A–10E shows the effect of low-frequency fluctuation of the rotation speed of the engine 1 in the steady state on the control of the torque converter 2.

Figure 9A:
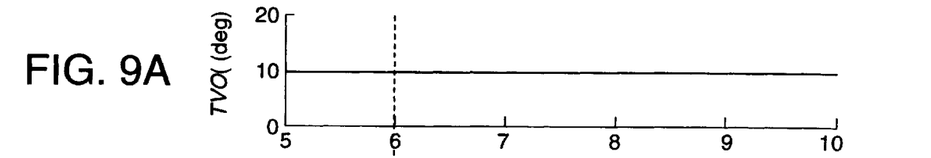
FIGS. 9A–9E are timing charts which compare the results of relative rotation control by the relative rotation control device with the results obtained by a prior art device.
Figure 9B:
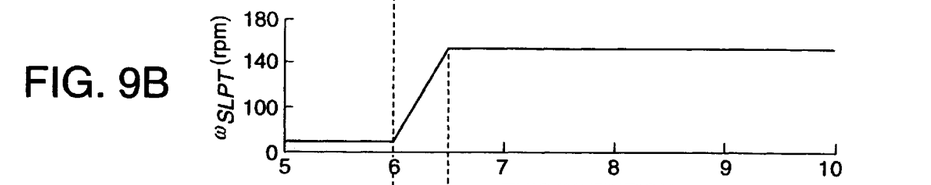
Figure 9C:
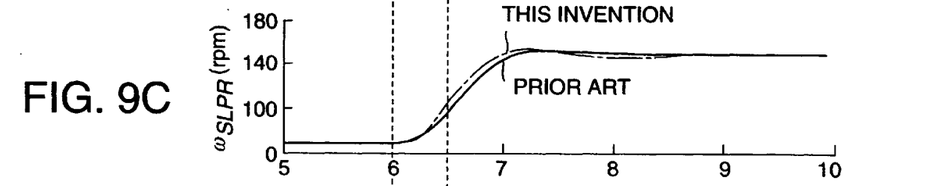
Figure 9D:
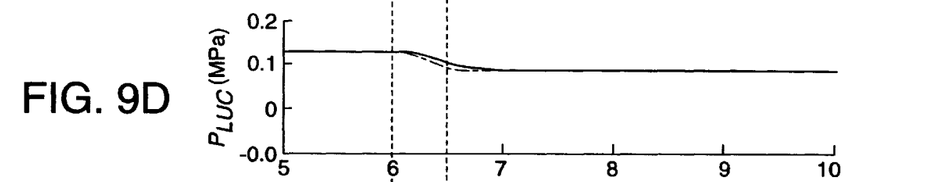
Figure 9E:
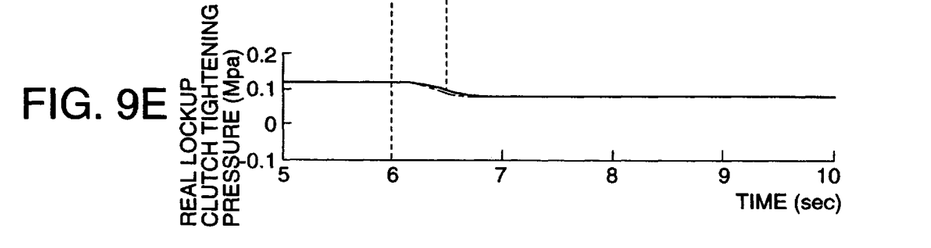
Figure 10A:
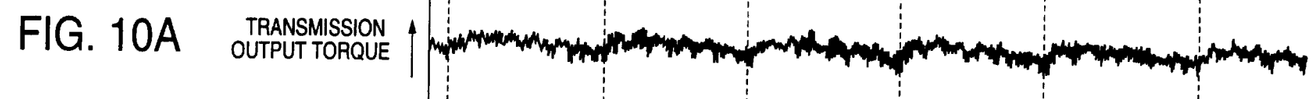
FIGS. 10A–10E are timing charts showing a low-frequency fluctuation of an engine rotation in the steady state and an output rotation of the torque converter, according to this invention.
Figure 10B:
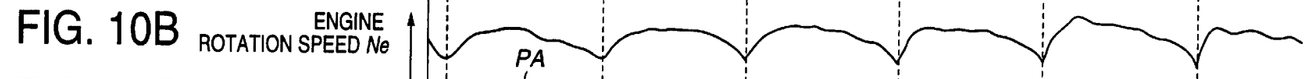
Figure 10C:
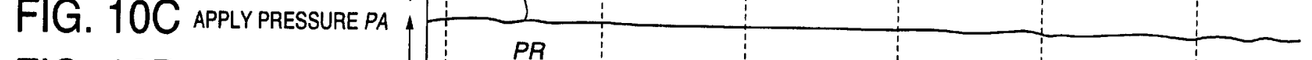
Figure 10D:
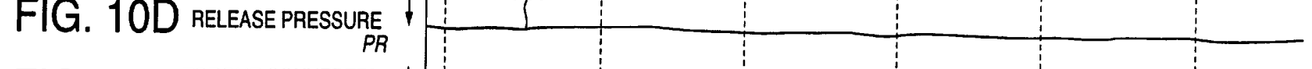
Figure 10E:
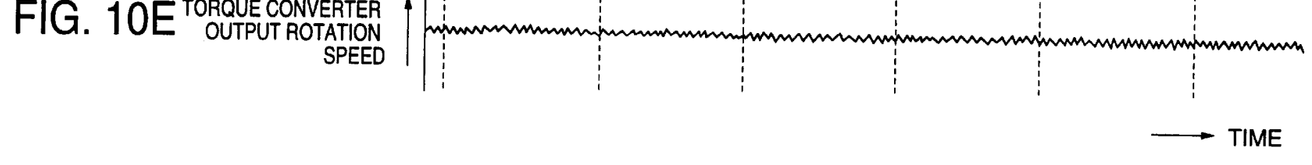

In the case where the response of the feedback control system is lowered so that this fluctuation should not exert any effect on variation of the output shaft torque of the automatic transmission 3, the tracking ability of the real relative rotation speed $\omega_{SLPR}$ decreases as shown by the solid lines of FIGS. 9C–9E when the target relative rotation speed $\omega_{SLPT}$ is used for control of the torque converter 2 without correction.

However, the response can be improved without changing the transfer characteristic of feedback control of the relative rotation speed of the input/output elements of the torque converter 2 as shown by the dot-and-dash line in the figure if the pre-processing compensating unit 42 corrects the target relative rotation speed $\omega_{SLPT}$ by using the aforesaid filter function as in this invention.

Figure 11:
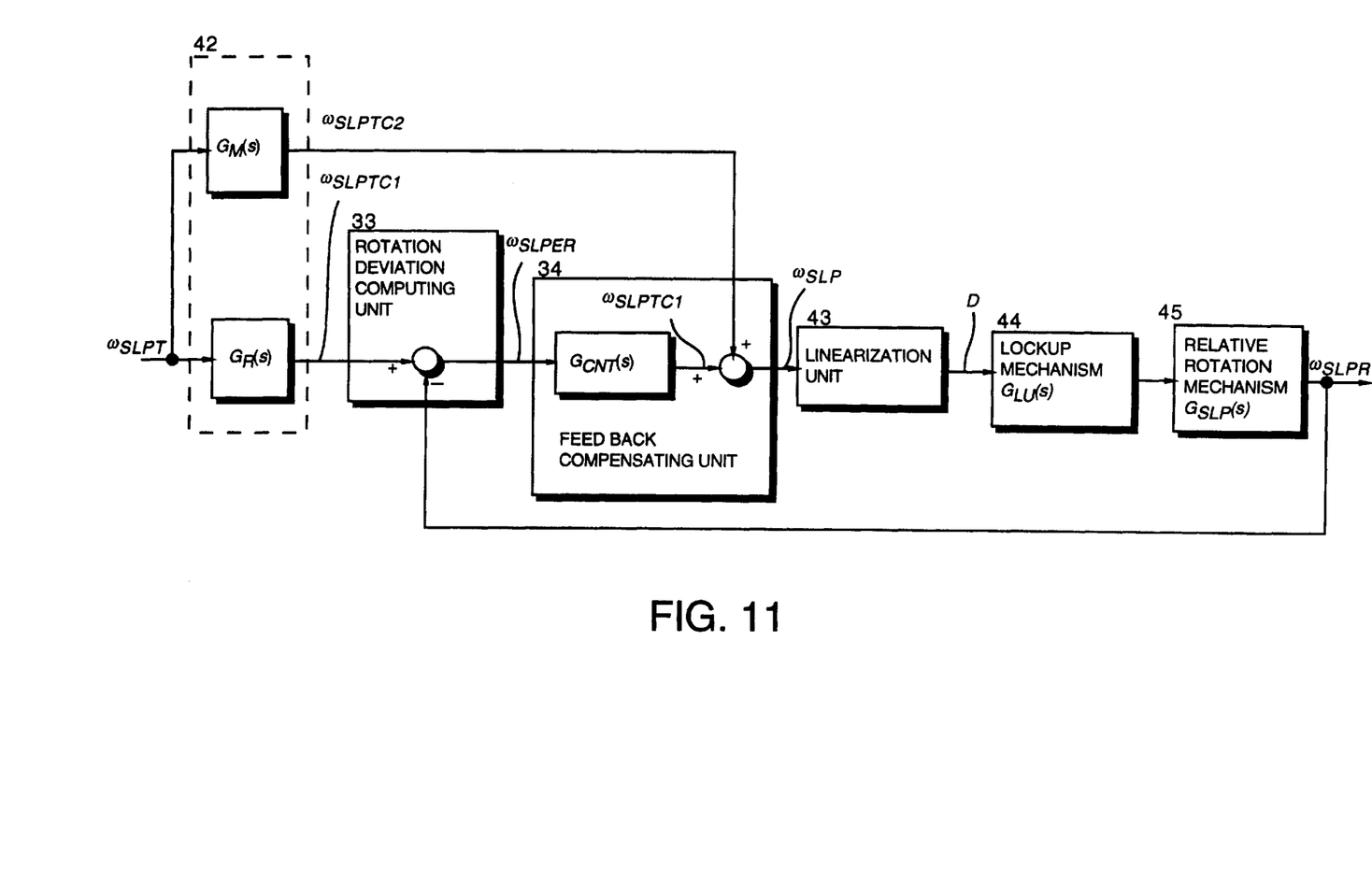
FIG. 11 is similar to FIG. 5, but showing another embodiment of this invention.

FIG. 11 shows a second embodiment of this invention related to the composition of the pre-processing compensating unit 42.

In this embodiment, a first target relative rotation speed $\omega_{SLPTC1}$ is calculated by the following equation (12) corresponding to the aforesaid equation (11).

$$\omega_{SLPTC1}(t) = G_R(s) \cdot \omega_{SLPT}(t) \tag{12}$$

$$= \frac{\gamma_1}{s + \gamma_1} \cdot \omega_{SLPT}(t)$$

The rotation deviation computing unit 33 calculates the deviation $\omega_{SLPER}$ between the first target relative rotation speed $\omega_{SLPTC1}$ and real relative rotation speed $\omega_{SLPR}$.

The feedback compensating unit 34 calculates the first relative rotation command value $\omega_{SLPC1}$ from this deviation by the following equation (13) based on the aforesaid equation (3).

$$\omega_{SLPC1}(t) = G_{CNT}(s) \cdot (\omega_{SLPTC1}(t) - \omega_{SLPR}(t)) \tag{13}$$

The pre-processing compensating unit 42 calculates a second target relative rotation correction value $\omega_{SLPTC2}$ by the following equation (14) corresponding to the aforesaid equation (10).

$$\omega_{SLPTC2}(t) = G_M(s) \cdot \omega_{SLPT}(t) \tag{14}$$

$$= \{J_E \cdot s + C_{SLP} \cdot (\omega_{TR})\} \cdot \frac{\gamma_1}{s + \gamma_1} \cdot \omega_{SLPT}(t)$$

where,
$J_E$=inertia of engine, and
$C_{SLP}$=coefficient of viscosity of torque converter fluid.

The feedback compensating unit 34 adds the second target relative rotation correction value $\omega_{SLPTC2}$ to the first relative rotation command value $\omega_{SLPC1}$ as shown by the following equation (15), and takes the result as the relative rotation command value $\omega_{SLPC}$.

$$\omega_{SLPC}(t) = \omega_{SLPC1}(t) + \omega_{SLPTC2}(t) \tag{15}$$

In this embodiment, the same desirable effect as in the first embodiment is achieved.

The embodiments of this invention in which an exclusive property or privilege is claimed are defined as follows:

What is claimed:

1. A relative rotation control device for a torque converter which is interposed between an engine and an automatic transmission and varies a relative rotation speed of an input element and an output element according to a tightening state of a lockup clutch, said device comprising:
    a sensor that detects a running state of a vehicle;
    a sensor that detects a real relative rotation speed of said torque converter; and
    a microprocessor programmed to:
        calculate a target relative rotation speed based on said running state;
        set a numerator filter variable according to said running state of said vehicle;
        calculate a target relative rotation speed by applying filter processing based on numerator filter variable to said target relative rotation speed basic value;
        calculate a relative rotation command value based on a deviation between said target relative rotation, speed and said real relative rotation speed by applying a predetermined transfer function said predetermined transfer function being expressed by a fraction of which a denominator includes said numerator filter variable; and
        control a tightening pressure of said lockup clutch to a value corresponding to said relative rotation command value.

2. A relative rotation control device as defined in claim 1, wherein said microprocessor is further programmed to calculate the target relative rotation speed by applying filter processing based on said numerator filter variable and a denominator filter variable determined based on a speed of said vehicle and a load of said engine, to said target relative rotation speed basic value.

3. A relative rotation control device as defined in claim 2, wherein said denominator filter variable is determined based on the speed of said vehicle, the load of said engine, and a gear ratio of said automatic transmission.

4. A relative rotation control device as defined in claim 2, wherein said denominator filter variable is determined based on the speed of said vehicle, the load of said engine, and a rotation speed of said output element.

5. A relative rotation control device as defined in claim 1, wherein said torque converter comprises a relative rotation mechanism which causes a relative rotation of the input element and the output element under a predetermined transfer function determined according to the characteristics of the torque converter and an inertia of the engine.

6. A relative rotation control device for a torque converter which is interposed between an engine and an automatic transmission and varies the relative rotation speed of an input element and an output element according to the tightening states of a lockup clutch, said device comprising:

a sensor that detects a running state of a vehicle;

a sensor that detects a real relative rotation speed of said torque converter; and a microprocessor programmed to:

calculate a target relative rotation speed based on said running state;

set a denominator filter variable based on the speed of said vehicle and the load of said engine, set a numerator filter variable based on the rotation speed of said output element;

calculate a target relative rotation speed by applying filter processing based on said denominator filter variable and said numerator filter variable to said target relative rotation speed basic value;

calculate a relative rotation command value based on a deviation between said target relative rotation speed and said real relative rotation speed; and control a tightening pressure of said lockup clutch to a value corresponding to said relative rotation command value.

7. A relative rotation control device as defined in claim 6, wherein said denominator filter variable is set based on the speed of said vehicle, the load of said engine and a gear ratio of said automatic transmission.

8. A relative rotation control device for a toque converter which is interposed between an engine and an automatic transmission and varies the relative rotation speed of an input element and an output element according to the tightening states of a lockup clutch, said device comprising:

a sensor that detects a running state of a vehicle;

a sensor that detects a real relative rotation speed of said torque converter; and a microprocessor programmed to:

calculate a target relative rotation speed based on said running state;

set a numerator filter variable according to said running state of said vehicle;

calculate a target relative rotation speed by applying filter processing based on said numerator filter variable to said target relative rotation speed basic value;

calculate a relative rotation command value based on a deviation between said target relative rotation speed and said real relative rotation speed by applying a predetermined transfer function given by a polynomial expression, said numerator filter variable being an inverse of a slowest mode in said polynomial expression; and control a tightening pressure of said lockup clutch to a value corresponding to said relative rotation command value.

* * * * *